No. 610,265. Patented Sept. 6, 1898.
V. C. DRIFFIELD, A. CAREY & F. W. WRIGHT.
PROCESS OF AND APPARATUS FOR MAKING BLEACHING POWDER.
(Application filed Oct. 26, 1897.)
(No Model.)
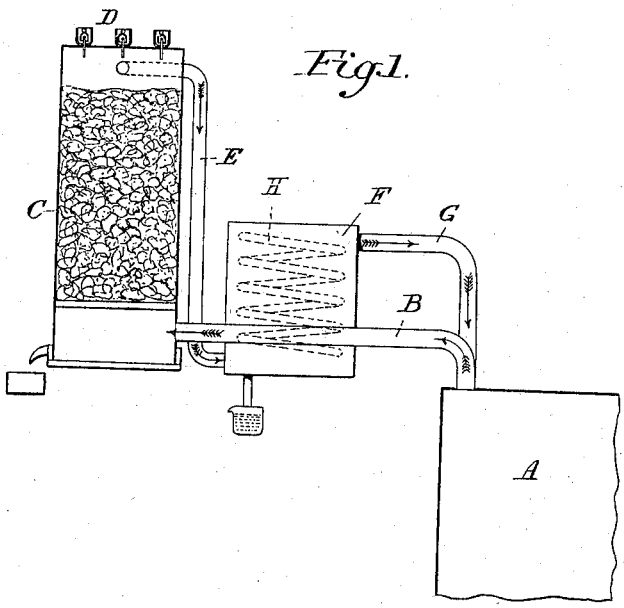
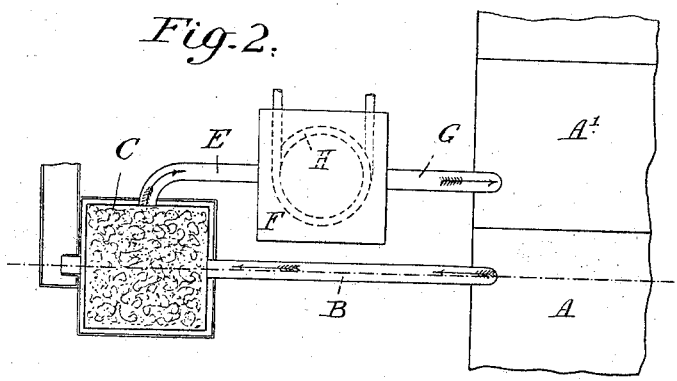

UNITED STATES PATENT OFFICE.

VERO C. DRIFFIELD, OF WIDNES, ARTHUR CAREY, OF LIVERPOOL, AND FREDERICK W. WRIGHT, OF WIDNES, ENGLAND, ASSIGNORS TO THE UNITED ALKALI COMPANY, LIMITED, OF LIVERPOOL, ENGLAND.

PROCESS OF AND APPARATUS FOR MAKING BLEACHING-POWDER.

SPECIFICATION forming part of Letters Patent No. 610,265, dated September 6, 1898.

Application filed October 26, 1897. Serial No. 656,428. (No model.) Patented in England December 29, 1893, No. 25,023.

*To all whom it may concern:*

Be it known that we, VERO CHARLES DRIFFIELD, engineer, residing at Cliff House, Appleton, Widnes, ARTHUR CAREY, analytical chemist, residing at Browside, Gateacre, Liverpool, and FREDERICK WILLIAM WRIGHT, chemist, residing at 18 Chester street, Widnes, all in the county of Lancaster, England, subjects of the Queen of Great Britain and Ireland, have invented certain Improvements in Processes of and Apparatus for the Manufacture of Bleaching-Powder, (for which we have obtained a patent in Great Britain, in conjunction with Holbrook Gaskell, Jr., of Clayton Lodge, Aigbruth, Liverpool, England, No. 25,023, dated December 29, 1893,) of which the following is a specification.

In the manufacture of bleaching-powder from chlorin gas which is largely diluted with other gases large surfaces of lime have to be exposed to the gas in order to absorb the chlorin. We have found that the chambers in which the exposure and absorption take place are apt to become too warm and that it is necessary to cool the gases after a certain amount of chlorin gas has been absorbed. Apparatus for this purpose forms the subject-matter of English Letters Patent No. 1,214, of the 19th of January, 1893. It has been found that when chlorin gas cooled by means of the said apparatus is brought into contact with comparatively cool lime or with partly-finished bleaching-powder moisture is apt to condense upon the surface of the lime, and more especially on the partly-made bleaching-powder, and that in consequence the bleaching-powder is frequently spoiled. We have found this to be due to the fact that the vapor tension of water in the presence of partially-made bleaching-powder increases as the temperature rises. Hence water is evolved from the partially-made bleaching-powder in the warmer compartments of the chamber and is carried by the chlorin gas into the succeeding compartments of the series, where this water is deposited on the first cool partially-made bleaching-powder over which the gases pass. The present invention has for its object to remedy this defect; and it consists in the removal of the water (thus evolved in the warm compartment of the bleaching-powder chamber) from the chlorin gas before passing it through the aforesaid cooling apparatus. The gas may be dried by passing it up through a tower containing some such material as coke or flint, down which strong sulfuric acid is run, or by contact with calcium chlorid or other sufficiently hydroscopic substance.

The accompanying diagram shows an arrangement of apparatus for effecting the drying according to this invention; but we do not limit ourselves to the precise arrangement shown.

Figure 1 is an elevation, and Fig. 2 a plan view.

A and A' are two absorption-compartments of a bleaching-powder chamber.

B is the pipe which conveys the gas from the compartment A to the drying-tower C, which contains coke, flints, or such like material, down which flows strong sulfuric acid, which may be introduced at the lutes D, the said acid meeting the gas and depriving it of watery vapor. After thus being dried the gas passes by the pipe E, when it may be conveyed direct into the compartment A', but we prefer to cool it as well, in which case it is conveyed into the cooling-chamber F and from thence into the compartment A' by the pipe G. The cooling-chamber is shown as being cooled by means of a coil H, through which water or other cooling medium circulates.

We have described the drying as being effected before the cooling, although of course the drying could be effected after the cooling; but it is best to do the drying first and the cooling after, because the absorption of the moisture by the hydroscopic substance, such as sulfuric acid, generates heat, and if the drying be effected after cooling this heat is not removed.

We claim—

1. In the manufacture of bleaching-powder in successive absorption-compartments, the drying of the gas issuing from any one compartment in order to remove the vapor of water evolved in that compartment or preceding compartments combined with the cooling of the gas before it enters a succeeding compartment, substantially as and for the purpose hereinbefore described.

2. In apparatus for the manufacture of bleaching-powder the combination with successive absorption-compartments through which chlorin gas passes in succession, of means—such as a cooling-chamber—and means—such as a coke-tower—through which the chlorin gas passes in one direction and sulfuric acid passes in the opposite direction, both such means being located between successive compartments, the former for cooling the gases and the latter for drying them in order to remove the vapor of water evolved in the preceding compartment or compartments before the gas passes to the succeeding compartment, substantially as described.

In testimony whereof we have signed our names to this specification in the presence of two subscribing witnesses.

VERO C. DRIFFIELD.
ARTHUR CAREY.
F. W. WRIGHT.

Witnesses:
 WM. PIERCE,
 S. MCCREADY.